(12) United States Patent
Whitsel et al.

(10) Patent No.: US 7,051,962 B2
(45) Date of Patent: May 30, 2006

(54) MANURE SEPARATOR (75) Inventors: Bradford H. Whitsel, Chambersburg, PA (US); Timothy N. Rensch, Chambersburg, PA (US); H. Kenneth Kipe, Chambersburg, PA (US)

(73) Assignee: Nutrient Control Systems, Inc., Chambersburg, PA (US)

( * ) Notice: Subject to any disclaimer, the term of this patent is extended or adjusted under 35 U.S.C. 154(b) by 266 days.

(21) Appl. No.: 10/665,790

(22) Filed: Sep. 18, 2003

(65) Prior Publication Data
US 2004/0129611 A1 Jul. 8, 2004

Related U.S. Application Data (60) Provisional application No. 60/412,150, filed on Sep. 19, 2002.

(51) Int. Cl.
*B01D 29/64* (2006.01)
*B02C 19/00* (2006.01)

(52) U.S. Cl. ............ 241/73; 210/396; 210/413

(58) Field of Classification Search ......... 241/24.11, 241/121, 73, 291, 292.1, 209; 209/234, 283, 209/284; 210/298, 386, 396, 397, 413, 414
See application file for complete search history.

(56) References Cited

U.S. PATENT DOCUMENTS

| | | | |
|---|---|---|---|
| 3,864,255 A | 2/1975 | Swanson | |
| 3,955,536 A | 5/1976 | Bunger | |
| 3,959,135 A | 5/1976 | Shattock | |
| 3,971,720 A | 7/1976 | Swanson et al. | |
| 4,042,511 A | 8/1977 | Ginaven | |
| 4,054,381 A | 10/1977 | Bernhard | |
| 4,247,055 A * | 1/1981 | Tucker, Jr. ............ | 241/119 |
| 4,298,473 A | 11/1981 | Wyman | |
| 4,376,044 A | 3/1983 | Ditzenberger | |
| 4,424,129 A | 1/1984 | Bunger | |
| 4,426,289 A | 1/1984 | Svehaug | |
| 4,485,013 A | 11/1984 | Cockman | |
| 4,504,020 A * | 3/1985 | Nishida et al. ......... | 241/121 |
| 4,666,602 A | 5/1987 | Hartzell | |
| 4,896,835 A | 1/1990 | Fahrenholz | |
| 4,915,671 A | 4/1990 | Johnson | |
| RE34,458 E | 11/1993 | Fahrenholz | |
| 5,268,100 A | 12/1993 | Hartzell | |
| 6,030,532 A | 2/2000 | Racine | |
| 6,136,191 A | 10/2000 | Gribble et al. | |
| 6,227,379 B1 | 5/2001 | Nesseth | |

\* cited by examiner

*Primary Examiner*—Mark Rosenbaum
(74) *Attorney, Agent, or Firm*—McNees Wallace & Nurick LLC (57) ABSTRACT

A novel separator housed within a shell for the separations of solid and liquid components from a slurry. The separator has two stages, a first static screen and rotating brush assembly section and a second stage, with a screen and a roller press and brush assembly. The slurry is pumped into the separator through a weir box. The slurry flows into the first stage and most of the liquid component flows into a sump located below the two stages. The solid component is then directed into the second stage where the rollers squeeze remaining liquids from the solid component. The brushes then direct the remaining solid component of the slurry into a solids discharge area.

27 Claims, 5 Drawing Sheets

MANURE SEPARATOR

CROSS REFERENCE TO RELATED APPLICATIONS

This application claims the benefit of U.S. Provisional Application No. 60/412,150, filed Sep. 19, 2002.

FIELD OF THE INVENTION

The present invention is directed to the field of agricultural manure separation.

BACKGROUND OF THE INVENTION

Separators are used in diverse applications such as separating manure fiber such as bedding and undigested feed from agricultural waste streams including dairy, poultry, swine and beef, etc., fruit pulp in the food processing industry, and solids from sewage.

Generally, separators are housed within a metal housing that prevents the influent, fiber, or separated liquid from spilling into the building in which the separator is housed. Generally, a separator is comprised of two compartments or stages, enclosed within a metal housing. These two compartments or stages are different interior sections of the housing. Influent, which comprises a manure slurry having solid and liquid components, is pumped into the separator from a lagoon or reception pit and flows into a first stage. Excess influent is returned to the lagoon or reception pit from a weir box overflow opening or an opening in the side of the enclosure that serves as a side wall of the first stage.

The first stage brushes on the prior art separator pass over the first stage screen at an angle perpendicular to the tangent of the screen's curve. In other words, the brushes pass over the screen at approximately a 90 degree angle over the entire semi-circle of the first stage screen. As the brush assembly rotates, passing from the vertical brushing position to the near-horizontal position at the discharge edge of the screen, the brush acts like a shovel, scooping much of the solid material up and over where it falls off from the overhead position back onto the stage one screen instead of brushing it into stage two. This leaves additional solid material in the stage one compartment reducing the efficiency of the screen.

The rollers on the prior art separator are mounted directly to rotary arms. The axle passes through the roller, through sealed metal bearings at both ends of the roller. The axle then passes through a rubber filled steel bushing that is rigidly clamped near the end of the rotary arm so that the roller follows the arm. The only resiliency to this roller apparatus is the thin rubber-like coating on the roller and the very limited flexibility permitted by the rubber filled bushing. As a result of this inflexibility, the roller cannot tolerate a foreign object without causing great stress or damage to the screen.

The rollers on the prior art separator are constructed of carbon steel with a rubber or rubber-like coating. Standard steel mechanical bearings with seals are pressed into ends of the roller cylinder and a carbon steel axle passes through sealed bearings. These bearings have limited durability and are extremely difficult to replace, as all the materials of construction are ferrous and subject to extreme corrosion when exposed to certain corrosive liquids such as animal manure. This typically necessitates replacement of the entire roller assembly including bearings and seals at great expense.

The rollers in the second stage of the prior art separator have pressed-in-place metal bearings and seals. A roller axle passes through these bearings and is clamped in a rubber-filled bushing. The seals wear out with great frequency exposing the metal bearings to the corrosive liquid being separated which quickly ruins the metal bearings. The rubber-filled bushings also have a limited life. Replacement of any of these individual components is very difficult because of corrosion, which usually necessitates the replacement of all of these components simultaneously at great inconvenience and expense.

The main rotary bearings on the prior art separator are metal bearings that must slide over the end of the shaft. Such bearings are constructed largely of ferrous material and require frequent lubrication. Typically, two styles are used, flange bearings and pillow block bearings. Both styles of bearings corrode quickly in corrosive environments such as manure liquids and aerosols and are difficult and expensive to replace. It is often impossible to remove the bearings from the end of the shaft, which typically necessitates removal of other drive components.

The prior art separator has a welded-in-place or bolted-in-place superstructure that covers the functional components of the machine, i.e., the rotary brush arms and the roller rotary press arms. The superstructure is fitted with access doors or panels to provide a way to service, adjust or observe the functional components. Even with all of the access ports open, actual access is restricted and visibility is impaired due to low light penetration. Removal of rollers, brushes and other functional components is extremely difficult because of the superstructure that remains in place even after the access panels/doors are removed.

The prior art separator has no provision for heating to prevent freezing of liquid influent inside the separator and assure continuous operation during cold weather except to cease operation accordingly or place the separator in a heated building. However, simply placing the separator in a heated building may be insufficient to avoid freezing of the liquid influent. Often cold air enters the separator from below the discharge area, freezing influent surrounding the rotary arms, thereby, preventing the rotary arms from rotating, which damages the drive components upon start-up of the separator.

The prior art separator is fitted only with hooking points for convenience in lifting the machine from above. Rigging or lifting the separator from below risks damage to fittings, sump and other vital components.

The prior art separator is fitted with first and second stage screens constructed of off-the-shelf perforated metal, usually stainless steel. Perforated metal screens must be of sufficient gauge thickness to withstand forces encountered during operation of the separator. Additionally, smaller pore sizes are desired to improve solids filtration efficiency at reasonably high flow-through rates. However, screens having these smaller pore sizes also have reduced thickness (gauge) which sacrifice durability. Perforated metal screens that are simultaneously durable, have small pore sizes for high filtration efficiency and a large percentage of open area for high liquid flow-rates are not readily commercially available.

The prior art separator has a number of shortcomings, one of which is the inefficient separation of liquids and solids. In addition, the bearings that support the axles tend to rust and wear out rapidly because of the corrosive nature of the manure slurry that is constantly being fed through the machine. The prior art separators do not work well in unheated buildings during the cold months of the year and are difficult to access for cleaning. The loading and installation of the separators is also extremely difficult as they are large and bulky. The prior art separator is constructed of ferrous material and galvanized ferrous material subject to corrosion and the corrosive manure environment.

What is needed is a separator that is more efficient, able to be easily and reliably heated, and has components that are more durable and more easily replaceable.

SUMMARY OF THE INVENTION

The present invention is a novel manure separator assembly for separating the solid component and the liquid component of manure slurry.

The present invention provides a two stage separator assembly. The separator assembly comprises an outer shell, which is substantially in the shape of a box and two separate stages for separating the manure solids from the liquids. The two stages are located within the outer shell. A power source or driving means, such as an electric motor, urges the components in the first and second stages into rotational movement.

The first compartment or stage of the separator comprises a first stage static screen assembly and a first stage rotating brush assembly. The sides of this compartment are substantially solid and impervious. The first stage static screen comprises a perforated screen or other perforated surface that is mounted to the first stage in a substantially semi-circular shape and positioned below the first stage brush assembly. The first stage brush assembly comprises brushes that are each affixed to the ends of arms that are rotatably carried by an axle. The first stage arms and brushes are urged to rotate about the axle by the electric motor. The first stage axle is rotatably carried by ultra-high molecular weight ("UHMW") plastic bearings. The first stage brushes are each angled with respect to the center axis of its corresponding arms, the angle being in the range of about 30 degrees to about 60 degrees oriented opposite to the direction of the brush travel.

In operation, manure slurry is pumped into a weir box attached to, and in fluid communication with the first stage. The manure slurry is pumped into the weir box through an influent supply pipe, which is in fluid communication with the weir box. The weir box comprises a weir wall, a weir overflow opening above the weir wall, an influent supply section positioned adjacent to and in fluid communication with the first stage, and an influent return section positioned adjacent to and in fluid communication with the influent supply section on the opposite side of the weir box from the first stage. The weir wall separates the influent supply section from the influent return section and the weir overflow opening is positioned above the weir wall. Manure slurry flows from the weir box directly into the first stage. However, if slurry is pumped into the weir box at an excessive rate, rather than flowing into the first stage, the excess slurry flows through the overflow opening, into the influent return section and down an influent return pipe, which is in fluid communication with the influent return section of the weir box.

When the slurry enters the first stage from the weir box, a substantial portion of the liquid component of the slurry is drained through the first stage screen while the solid component of the slurry remains on top of the screen. The liquid component flows into a sump section of the separator, which is positioned below the two stages. The liquid component then flows down a separated liquid drain at a base of the sump, which is positioned below the second stage. The first stage rotating angled brushes direct, or brush, the solid component from the first stage into the second stage without scooping up the solid component which would cause the solid component to fall back onto the first stage screen. Openings in the walls of the first stage portion, which are in fluid communication with a preselected region of the first stage separator above the first stage screen and which are in fluid communication with the influent return pipe, permit any excess slurry in the first stage to be drained into the influent return pipe. An access port positioned substantially below the first stage screen permits access to the first stage screen for pressure washing.

The second compartment or stage of the separator comprises a second stage perforated screen and a second stage rotating roller press and brush assembly that is urged into rotational movement by the electric motor. The sides of this second compartment are substantially solid and impervious. The second stage screen comprises a substantially semi-circular perforated metal or woven wire mesh screen assembly that is mounted to the second stage and positioned below the second stage brush assembly. The second stage roller press and brush assembly comprise separate sub-assembly components, including a main arm, roller sub-assemblies and brush sub-assemblies. The main arm is substantially linear and has a midpoint and two ends, and is attached to and is rotatably carried by a second stage axle at its midpoint. The second stage axle is rotatably carried by UHMW bearings.

Roller sub-assemblies are attached to the ends of the second stage main arm. Each roller sub-assembly comprises substantially linear roller sub-assembly arms, each arm having a midpoint, a first end and a second end. The roller sub-assembly arms are rotatably carried by each end of the main arm at their midpoints. Each of the first ends of the roller sub-assembly arms secure a stainless steel shaft, which rotatably carries a UHMW roller. The second ends of the roller sub-assembly arms are attached to resilient force devices. During operation, the resilient force devices urge the rollers against the second stage screen. If, during operation, the rollers encounter a foreign object such as a block of wood or a stone, the resilient force devices flex, permitting the rollers to rotate about the midpoint of the sub-assembly arms to roll over the foreign object without damaging the screen.

The second stage brush sub-assemblies comprise substantially linear second stage brush arms and brushes. The brush arms are attached to and extend away from the second stage main arm, while the brushes are attached to the ends of the brush arms. The second stage brushes are angled with respect to the centerlines of the arms.

In operation, when the solid influent, also referred to as solids, enter the second stage after being brushed from the first stage, the solids are deposited onto the second stage screen where residual liquid drains from the solids through the screen into the sump below. The rollers of the second stage roll over the solids, which express additional liquid from the solids through the screen into the sump below the screen. The solids remain on top of the screen to be directed into a solids discharge section by the brushes of the second stage. The access port, which is also positioned partially below the second stage screen provides access to the second stage screen for pressure washing.

The interior of the separator may be accessed either by opening clamshell lids on the top of the separator or by opening an access panel positioned on the side of the separator. A duct collar mounted on the top of the separator shell permits warm air to be pumped into the separator assembly if the separator is operating in a cold environment. The separator may be heated by blowing warm air through a duct collar located on top of the separator. The lower chassis of the separator has a series of channels, which are configured to accommodate a forklift from each of the four sides.

The present invention relates to a rotatable roller press and brush assembly for use within in a separator. The roller press and brush assembly includes a main arm having ends, and a main axle configured and disposed to rotatably carry the main arm between the ends. At least one brush arm is attached to and extends away from the main arm, each of the at least one brush arm being connected to a brush adjacent the end of the brush arm opposite the main arm. At least one roller arm has a first end and a second end, the at least one roller arm being rotatably carried between the first end and the second end adjacent at least one of the ends of the main arm. A roller is rotatably carried adjacent the first end of the at least one roller arm, and a resilient force device is connected to at least one roller arm and the main arm for urging the roller away from the main axle.

The present invention also relates to a manure separator including a shell and an inlet including a slurry supply section for providing a slurry to the separator. A first section within the shell includes a first screen and a rotating brush assembly, the first section being adjacent to and in fluid communication with the inlet. The brush assembly includes at least one first brush and at least one arm, each of the at least one first brush being attached to at least one arm, and each of the at least one arm being rotatably carried within the shell adjacent the first screen to direct solid slurry components of the slurry from the first section to a second section. The second section within the shell adjacent to and in fluid communication with the first section includes a second screen and a rotating roller press and brush assembly being rotatably carried within the shell adjacent the second screen. The roller press and brush assembly includes a main arm having opposed ends, and a main axle configured and disposed to rotatably carry the main arm between the opposed ends. At least one brush arm is attached to and extends away from the main arm, each of the at least one brush arm being connected to a second brush adjacent the end of the brush arm opposite the main arm. At least one roller arm has a first end and a second end, the roller arm being rotatably carried between the first end and the second end adjacent at least one of the opposed ends of the main arm. A roller is rotatably carried adjacent the first end of the at least one roller arm, and a resilient force device is connected to at least one roller arm and the main arm for urging the roller away from the main axle. A driving means urges rotational movement of the brush assembly and the roller press and brush assembly. A sump is in fluid communication with the first section and the second section for draining liquid slurry components of the slurry from the first section and the second section, and a solids discharge section in communication with the second section discharges solid slurry components of the slurry from the second section.

The present invention further relates to a manure separator including a shell and a weir box in fluid communication with the shell for providing influent to the separator. A first section within the shell in fluid communication with the weir box includes a first screen and a rotating brush assembly, the brush assembly including a plurality of first brushes and a plurality of arms. Each first brush of the plurality of first brushes is attached to an arm of the plurality of arms, and each arm of the plurality of arms being rotatably carried by a first main axle mounted in the shell adjacent the first screen. Each arm of the plurality of arms has a first central axis, and each first brush of the plurality of brushes has a first angle in the range of about 30 degrees to about 60 degrees between the first central axis and the plurality of first brushes away from a direction of rotational travel of the plurality of first brushes for directing solid influent from the first section to the second section. A second section within the shell adjacent to and in fluid communication with the first section includes a second screen and a rotating roller press and brush assembly. The roller press and brush assembly includes a main arm having two ends being rotatably carried by a second main axle mounted in the shell adjacent the second screen. A plurality of brush sub-assemblies attach to and extend away from the main arm, each brush sub-assembly of the plurality of brush sub-assemblies including a brush arm having a second central axis and an end opposite the main arm and a second brush attached adjacent the end of the brush arm. Each second brush of the plurality of second brushes have a second angle in the range of about 30 degrees to about 60 degrees between the second central axis and the plurality of second brushes in a direction of rotational travel of the plurality of second brushes. A plurality of roller press sub-assemblies include a roller sub-assembly arm having a first end and a second end for rotatably carrying a roller adjacent the first end. Each of the plurality of roller press sub-assemblies are rotatably carried between the first end and the second end of the roller sub-assembly arm adjacent one of the two ends of the main arm. A spring assembly attaches to the roller sub-assembly arm for urging the roller in a direction away from the second main axle, and a stop screw and a mechanical stop are secured to the main arm to adjustably position the roller a predetermined distance from the main axle. A driving means is connected to the brush assembly and the main arm for urging the brush assembly and the main arm into a predetermined rotational movement. A sump is in fluid communication with the first section and the second section for draining liquid influent from the first section and the second section. A discharge section is in communication with the second section for discharging solid influent from the second section.

The present invention still further relates to a manure separator including a shell and a weir box including a slurry supply section for providing slurry to the separator. A first section within the shell includes a first screen and a rotatable brush assembly. The first screen may be constructed of stainless steel woven wire mesh spot welded to expanded metal. Said brush assembly includes a plurality of brushes and a plurality of arms, each brush being attached to an arm, and each arm being attached to a first axle mounted over the first screen. Said arms of the first section are substantially linear, and each brush of the said first section being angled at an angle in the range of about 30 degrees to about 60 degrees away from the arms toward a second section for directing solid influent from the first section to a second section. The second section within the stainless steel shell includes a second screen, said second screen including stainless steel woven wire mesh, and a rotatable roller press assembly. Said roller press assembly is mounted to a second axle mounted over the second screen, said second section being positioned adjacent to said first section. Said roller press assembly includes a plurality of arms, a plurality of brush assemblies attached to said arms, and a plurality of roller sub-assemblies attached to said arms. Each of said roller sub-assemblies include a center pivot, a first end and a second end, a roller being attached to each first end and a spring assembly attached to each second end, each spring assembly being further attached to one of the brush assemblies. A plurality of ultra high molecular weight bearings, said bearings being mounted on the shell, the bearings supporting the first main axle and the second main axle. An electric motor urges the brush assembly and the roller press assembly into a predetermined rotational movement. A sump drains liquid slurry components from the separator; and a solids discharge section for discharging solid slurry components from the second section.

The present invention yet still further relates to a manure separator including a shell composed of stainless steel, and a weir box comprising a slurry supply section for providing slurry to the separator. The shell has a plurality of channels that are configured and disposed to accommodate forklift forks. A first section within the shell includes a first screen including stainless steel woven wire mesh and a rotatable brush assembly, said brush assembly including a plurality of brushes and a plurality of first arms, each brush being attached to a first arm, and each first arm being attached to a first stainless steel axle mounted over the first screen. Said first stainless steel axle is rotatably carried by removable bearings composed of ultra high molecular weight plastic, said first arms of the first section being substantially linear, and each brush of the said first section being angled at an angle in the range of about 30 degrees to about 60 degrees away from the first arms toward a second section for directing solid influent from the first section to a second section. The second section within the stainless steel shell includes a second screen and a rotatable roller press assembly, said roller press assembly being mounted to a second stainless steel axle mounted over the second screen. Said second stainless steel axle is rotatably carried by removable bearings composed of ultra high molecular weight plastic, said second section being positioned adjacent to said first section. Said roller press assembly includes a plurality of second arms, a plurality of brush assemblies attached to at least a portion of the plurality of said second arms, and a plurality of roller sub-assemblies attached to the remaining of said second arms, each brush sub-assembly of the plurality of brush sub-assemblies including a brush arm having a second central axis and an end opposite the corresponding second arm and a second brush attached adjacent the end of its corresponding second arm, each second brush of the plurality of second brushes having a second angle in the range of about 0 degrees to about 45 degrees between the second central axis and the plurality of second brushes in a direction of rotational travel of the plurality of second brushes; Each of said roller sub-assemblies includes a center pivot, a first end and a second end, a roller composed of ultra high molecular weight plastic being attached to each first end and a spring assembly attached to each second end, each spring assembly being further attached to one of the brush assemblies. An electric motor urges the brush assembly and the roller press assembly into a predetermined rotational movement. At least one clamshell lid is pivotably mounted to the shell, said at least one clamshell lid being in fluid communication with a source of warm air for heating the separator. A sump drains liquid slurry components from the separator; and a solids discharge section for discharging solid slurry components from the second section.

An advantage of this invention is that the efficiency of the first stage is improved through the use of angled brushes, which permit solids to be pushed out of the first stage, rather than being scooped up and permitted to fall back onto the first stage screen.

Another advantage of this invention is that the second stage roller press and brush assembly has springs that resiliently flex if the rollers encounter a foreign object, permitting the rollers to rotate about the midpoint of the sub-assembly arms, which protects the second stage screen from damage by the foreign object.

Another advantage of this invention is that the bearings can be removed without necessitating the removal of other drive components.

Another advantage of the present invention is that access to the interior of the separator is greatly improved since the clamshell lids of the separator are easily opened or removed.

Another advantage of the present invention is that the separator of the present invention can easily be rigged, or lifted with a forklift, using holes formed in each of the four sides of the lower chassis of the separator.

Another advantage of the present invention is that the separator, with exception of drive components, is constructed of stainless steel and UHMW bearing surfaces.

Another advantage of the present invention is that the durability of the roller press and brush assembly has been increased through the use of stainless steel shafts and UHMW plastic rollers.

Another advantage of the present invention is that the serviceability of the roller press and brush assembly has been increased through the use of stainless steel shafts and UHMW plastic rollers.

Another advantage of the present invention is that the filtration efficiency of the present invention has been improved through the use of a screen assembly comprising stainless steel woven wire mesh spot welded to flattened stainless steel expanded metal.

Another advantage of the present invention is an ability to heat the separator by providing a duct collar on the separator, which permits the attachment of a duct through which warm air can be supplied to the separator.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
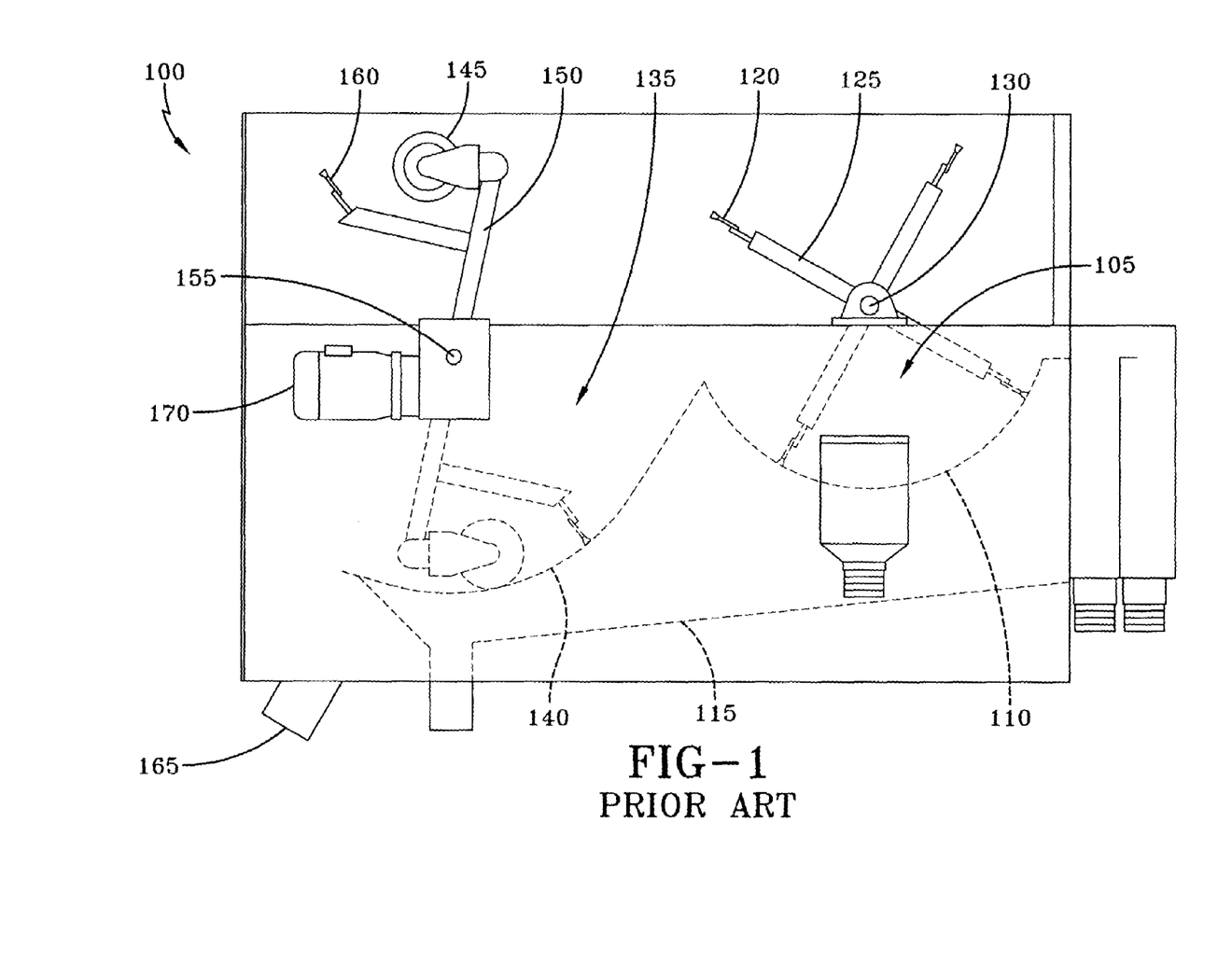
FIG. 1 is a partial cross-sectional view of a prior art separator.

Referring now to FIG. 1, the prior art separator 100 has a first compartment 105, or first stage, which is a static screen stage. The bottom of this compartment is comprised of a semicircular perforated screen 110 preferably defining a half circle. The sides of this compartment are solid and impervious. Liquid slurry enters this first compartment where the liquid falls through the screen 110 into a sump 115 below leaving the solids behind on the surface of the screen 110. Brushes 120 are affixed to ends of substantially linear arms 125 that are rotatably carried by an axle 130 mounted over the screen 110. The rotating brushes 120 are maintained in sliding tangential contact with the screen 110, the brushes 120 being substantially perpendicular to the tangent between the brushes and the screen to direct or push the solids into a second compartment, or second stage, 135. The second compartment 135, stage two, functions as a roller press. An electric motor 170 urges both the arms 125, 150 into rotational movement, such as by a chain or belt (not shown). The bottom of the compartment 135 is comprised of a semicircular perforated screen 140 or surface. The sides of this compartment are solid and impervious. The solids enter the compartment 135 where they rest on the screen 140 to drain. Rollers 145 rotatably carried by arms 150 that are likewise rotatably carried by an axle 155 mounted over the screen 140 rotatably contact the surface of the semicircular screen 140. Since the solids rest on the screen 140, the rollers 145 rotatably contact the solids, expressing additional liquids into the sump 115 below the screen 140. Brushes 160, that are attached to arms extending from arms 150, also rotate about axle 155, which direct or push the solids into the solids discharge 165, also referred to as a discharge. The liquids are drained from the sump 115.

Figure 2:
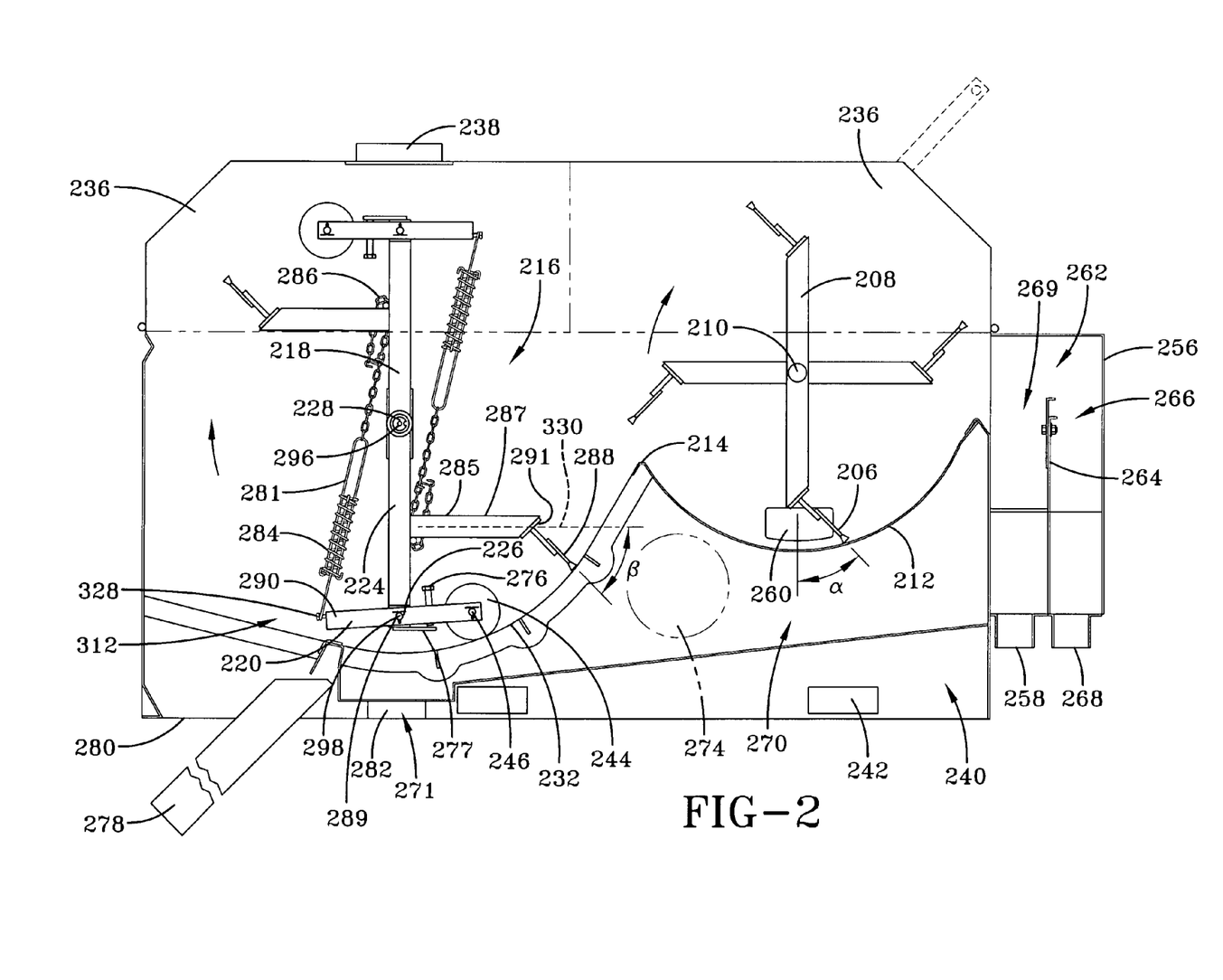
FIG. 2 is a partial cross-sectional view of the separator of the present invention.

Referring now to FIG. 2, the manure separator 200 of the present invention comprising two compartments, a first compartment 202, or stage, and a second compartment 216, or stage, is shown. The first compartment 202, or stage, of the separator comprises a first stage static screen assembly 212 and a first stage rotating brush assembly 204. The sides of this compartment 202 are substantially solid and impervious. The first stage static screen assembly 212 comprises a screen or other surface that is mounted to the first stage 202 in a semi-circular shape and positioned below the first stage rotating brush assembly 204. The present invention improves the filtration efficiency of the separator by using the first stage screen assembly 212 comprising stainless steel woven wire mesh spot welded to stainless steel, flattened expanded metal. Woven wire mesh has a very large percentage of open area and is available in a wide array of nominal pore sizes so filtration efficiency can be easily adjusted to maximize the amount of liquid that can be extracted from the manure slurry. The second stage screen 232 permits additional liquid to be extracted from the solid component received from the first stage when the solid component is compressed between the second stage screen 232 and the second stage rotating roller press and brush assembly 218. The first stage rotating brush assembly 204 comprises brushes 206 that are affixed to arms 208 that are rotatably carried by an axle 210 that is adjacent the screen 212. The first stage axle 210 is rotatably carried by non-corrosive ultra-high molecular weight ("UHMW") plastic rotary bearings (shown in FIG. 5) single style, split flange bearings. The bearings 215 do not have to be split flange, and can be a unitary unit, however, the split flange is the preferred embodiment. Because bearings 215 are symmetrical, they can be rotated 180 degrees and or flipped and reinstalled for continued use in a different position in the separator 200. The bearings 215 do not have to be symmetrical, but symmetrical bearings are preferred. Additionally, because the bearings 215 are split in the center, they can be easily removed without necessitating the removal of other drive components that might be mounted on the same shaft such as motors, pulleys, sprockets, etc. Finally, bearings 215 constructed of UHMW plastic are preferred over metal bearings because the plastic bearings do not corrode, resist wear extremely well and cost much less than metal bearings.

The first stage brushes 206 are angled with respect to a center axis 209 of arms 208 at an angle $\alpha$, which improves the efficiency in the first stage over the prior art. In a preferred embodiment, $\alpha$ is in the range of about 30 degrees to about 60 degrees. In a more preferred embodiment, $\alpha$ is about 45 degrees. In an alternative embodiment, $\alpha$ is about 40 degrees. The brushes 206 are maintained at angle $\alpha$, so that when the brush assembly 204 rotates, passing from the vertical brushing position to the near-horizontal position at a discharge edge 214 of the stage one screen, the brushes 206 are oriented downward in a direction away from the direction of travel of the brushes 206. This downward orientation allows most of the solids to fall off the edge 214 and into the second stage 216 instead of being scooped up and over the brushes 206 to fall back on the first stage screen assembly 212.

In operation, manure slurry is pumped into a weir box 256 attached to, and in fluid communication with, the first stage 202. The manure slurry is pumped into the weir box 256 through an influent supply pipe 258, also referred to as an inlet, which is in fluid communication with the weir box 256. The weir box 256 comprises an adjustable weir wall 264, a weir overflow opening 262 above the weir wall 264, an influent supply section 269 positioned adjacent to and in fluid communication with the first stage 202, and an influent return section 266 positioned adjacent to and in fluid communication with the influent supply section 269 on the opposite side of the weir box 256 from the first stage 202. The weir wall 264 separates the influent supply section 269 from the influent return section 266 and the weir overflow opening 262 is positioned above the weir wall 264. In operation under preferred manure slurry flow conditions, manure slurry flows from the weir box 256 directly into the first stage 202. However, if slurry is pumped into the weir box 256 at an excessive rate, rather than flowing into the first stage 202, the excess slurry flows over the top of weir wall 264, through the overflow opening 262, into the influent return section 266 and down an influent return pipe 268, which is in fluid communication with the influent return section 268 of the weir box 256.

When the slurry enters the first stage 202 from the weir box 256, a substantial portion of the liquid component of the slurry is drained through the first stage screen assembly 212 while the solid component of the slurry remains on top of the screen assembly 212. The liquid component flows into a sump section 270 of the separator, which is positioned below the two stages. The liquid component then flows down a separated liquid drain 271 at a base of the sump 270. During operation, the first stage rotating angled brushes 206 move, or brush, the solid component of the slurry from the first stage 202 into the second stage 216 without scooping up the solid component, which would cause at least a portion of the solid component to fall back onto the first stage screen 202. Openings 260 in the walls of the first stage 202, which are in fluid communication with a preselected region of the first stage 202 above the first stage screen assembly 212 and which are in fluid communication with the influent return pipe 268, permit any excess slurry in the first stage 202 to be drained into the influent return pipe 268. An access port 274 positioned substantially below the first stage screen assembly 212 provides access to the first stage screen 212 for pressure washing.

The second compartment 216, or stage, of the separator comprises a second stage screen 232 and a second stage rotating roller press and brush assembly 218. The sides of this compartment are substantially solid and impervious. The second stage screen 232 comprises a substantially semi-circular perforated metal or woven wire mesh screen assembly that is mounted to the second stage 216 and positioned below the second stage roller press and brush assembly 220 and adjacent to the first stage screen assembly 212.

The present invention improves the durability of the roller press by constructing the roller press and brush assembly 218 and roller press sub-assembly 220 from stainless steel and constructing the rollers 244 from UHMW plastic. The use of UHMW plastic virtually eliminates destructive corrosion and hence the expense associated with replacing components that will quickly corrode beyond repair.

Figure 3:
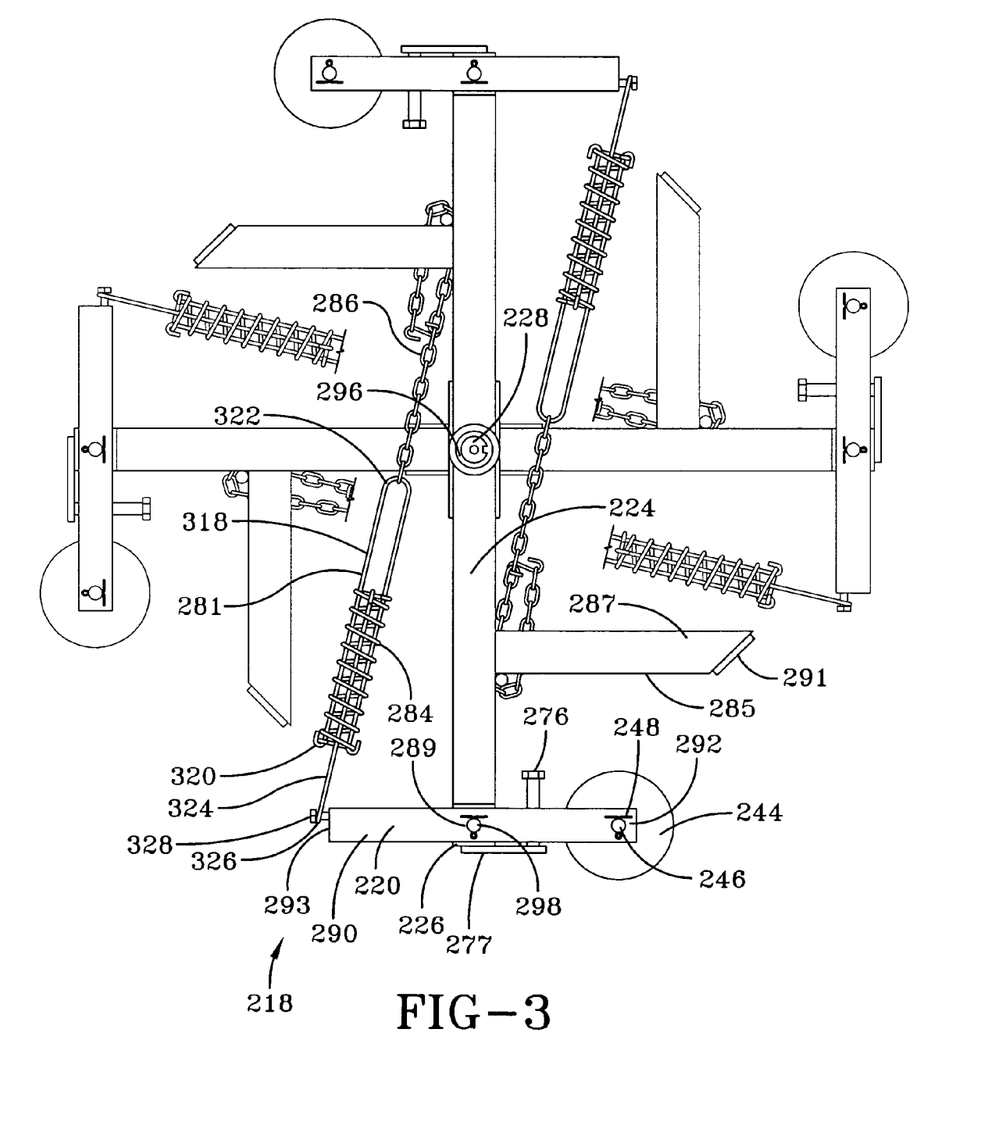
FIG. 3 is a partial sectional view of the roller press assembly of the separator of the present invention, shown without the brush sub-assembly.

The second stage roller press and brush assembly 218 comprises separate sub-assembly components, including a main arm 224, roller subassemblies 220 and brush sub-assemblies 287, all of which are manufactured from stainless steel, with the exception of rollers 244, which are UHMW plastic and brushes 288, which are preferably comprised of nylon. However, as shown in FIG. 3, multiple main arms 224, as well as multiple roller subassemblies 220 and brush sub-assemblies 287 associated with each main arm 224 may be employed. The use of stainless steel improves the durability of the second stage roller press and brush assembly 218. The sides of this compartment are substantially solid and impervious. The main arm 224 is substantially linear and has a midpoint 228 and opposed ends 226. A second stage main arm axle 296 rotatably carries roller press and brush assembly 218, permitting rotation of the roller press and brush assembly 218 at its midpoint 228 about main axle 296. Roller sub-assemblies 220 are attached adjacent to the ends 226 of the second stage main arm 224. Each roller sub-assembly 220 comprises substantially linear roller sub-assembly arms 290, also referred to as roller arms, each arm having a midpoint 289, a first end 292 and a second end 293. The roller sub-assembly arms 290 are attached to each end 226 of the main arm 224 at their midpoints 289 and each roller sub-assembly arm is rotatably carried by an axle 298 such that each of the sub-assembly arms 290 can pivot at their respective midpoints 289. Alternatively, the arms 290 may be configured to rotate about a position other than the midpoint 289. The first ends 292 of the roller sub-assembly arms 290 rotatably carry UHMW rollers 244. The use of UHMW plastic virtually eliminates destructive corrosion and hence the expense associated with replacing components that have decomposed beyond repair. A stainless steel 246 shaft rotatably carries each of the rollers 244 adjacent to each of the ends 293 of the sub-assembly arms 290. The shaft 246 is configured to receive a stainless steel cotter pin 248 at one or both ends to facilitate easy removal and replacement of shaft 246 if desired. The second ends 292 of the roller sub-assembly arms 290 are attached to spring assemblies 281. The novel resilient arrangement of the spring assemblies 281, also referred to as a resilient force device, mounted to the roller press and brush assembly 218 helps prevent damage to the screen 232 by a foreign object.

Each of the spring assemblies 281 comprises an elongate wire frame 318 resembling a "U". The ends of the frame 318 define opposed hooks 320. A portion of the frame 318 opposite the hooks 320 defines a base 322. One end of the compression spring 284 is configured to serially slide over the base 322 until contacting and engaging the hooks 320. The spring 284 cannot slide over the hooks 320. A rod 324 has opposed end loops 326, one end loop 326 being directed through the end of the spring 284 adjacent hooks 320, through the entire length of the spring 284, the end loop 326 then being placed in secure engagement with the end of the spring opposite hooks 320. The opposite end loop 326 of rod 324 is secured to a protrusion 328, such as an end of a bolt protruding from the end 293 of the arm 290. A chain is secured to the base 322 of the spring assembly 281 while end loop 326 is secured to the protrusion 328.

Once the spring assembly 281 is installed, upon sufficiently pivoting the roller 244 about midpoint 289 so that roller 244 is directed toward the axle 298, the spring 284 is placed in compression. In other words, the end loop 326 that is secured opposite the hooks 320 is urged in a direction along the rod 324 toward hooks 320, which compresses the spring 284. Each of the spring assemblies 281 is secured as discussed above, the chain 286 being sufficiently adjusted, after looping the end of the chain 286 opposite the base 322 around the arm 285, so that upon the roller 244 contacting the second stage screen 232, a predetermined range of compressive forces is imposed on the spring 281. In other words, during operation, the springs 284 urge the rollers 244 against the second stage screen 232. If, during operation, the rollers 244 encounter a foreign object such as a block of wood or a stone, the roller 244 merely additionally pivots sufficiently about the midpoint 289 to roll over the foreign object. While this additional pivot by the roller 244 subjects the spring 284 to an increased compression force, the increased compression is a function of the stiffness of the spring, and is controllable, is only temporary and does not damage the screen 232.

As soon as the roller 244 rolls past the foreign object, the roller 244 returns to its previous position with respect to the screen 232, reducing the compression force that is applied to the spring 284. This resilient adjustment by the spring 284, also referred to as "flex", prevents damage to the screen 232. In a preferred embodiment, the springs 284 can flex as much as about ¾". Stop screws 276 are adjustably connected to mechanical stops 277, which are attached to the roller press and brush assembly 218 adjacent the end 226, such that adjustment of the roller 244 relative to the screen 232 is permitted. When the end of the stop screw 276 abuts stop 277, the roller 244 is prevented from further rotating about midpoint 289 in a direction away from the main arm axle 296. Absent the stop 277, the spring assembly 281 would pivot the roller 244 about the midpoint 289 to the extent required to sufficiently remove compression forces applied to the spring 284. This could result in the roller 244 colliding with the discharge edge 214 to an extent that could damage either or both the roller or discharge edge.

It is appreciated by one having ordinary skill in the art, that spring assembly 281 may be a helical spring or a torsion spring. It is further appreciated that one end of the spring 284 may be directly secured to the main arm 224 and the other end of the spring 284 may be secured at any position along arm 290 other than the midpoint 289 as the spring 284 may operate either in compression or in tension to urge the roller 244 in the desired direction. If the spring 284 is a torsion spring, the end of the spring may even be secured along the midpoint 289 of the arm 290. Additionally, referring to FIG. 2, a simple spring 284 or spring assembly 281 could be employed instead of using two springs if the opposed ends of the spring 284 or spring assembly 281 were secured to opposed protrusions 328, taking into account ways to provide sufficient clearance of the main axle 296, such as a curved member (not shown).

The second stage brush sub-assemblies 287 comprise substantially linear second stage brush arms 285 and brushes 288. The brush arms 285 are attached to and extend outward from the second stage main arm 224, while the brushes 288 are attached to the ends 291 of the brush arms 285. The second stage brushes 288 are angled with respect to a center axis 330 of the arms 285, defining an angle β that is between about 0 degrees and 45 degrees from the axis defined by brushes 288. In a preferred embodiment, the angle β is about 22 degrees.

The second stage axle is supported by non-corrosive split flange UHMW bearings 234. The bearings 234 do not have to be a split flange, and can be a unitary unit, however, the split flange is the preferred embodiment. In the preferred embodiment, all main rotary bearings 215, 234 are identical in design and function, and hence, interchangeable one with another. Because the UHMW bearings 234 are symmetrical, they can be rotated 180 degrees and/or flipped and reinstalled for continued use. The bearings 234 do not have to be symmetrical, but symmetrical bearings are preferred. Additionally, because the bearings 234 are split in the center, they can be easily removed without necessitating the removal of other drive components that might be mounted on the same shaft such as motors, pulleys, sprockets, etc. Finally, bearings 234 constructed of UHMW are preferred over metal bearings because UHMW bearings do not corrode, resist wear better and cost much less than metal bearings.

In operation, when the solids enters the second stage 216 after being brushed from the first stage 202, the solids are deposited onto the second stage screen 232 where residual liquid drains from the solids through the screen into the sump 270 below. The rollers 244 of the second stage 232 roll over the solids, which express additional liquids from the solids, through the screen 232 into the sump 270 below the screen 232. The solids remain on top of the screen 232 to be brushed into a solids discharge section 312 by the brushes 288 of the second stage. The optional chute 278 for the manure solids is shown. The manure solids may also be pushed out a hole 280 in the bottom of the separator 200. The sump section 270 drains into a separated liquid drain 282. The access port 274, which is also positioned partially below the second stage screen 232 provides convenient access to the second stage screen 232 for pressure washing.

Figure 4:
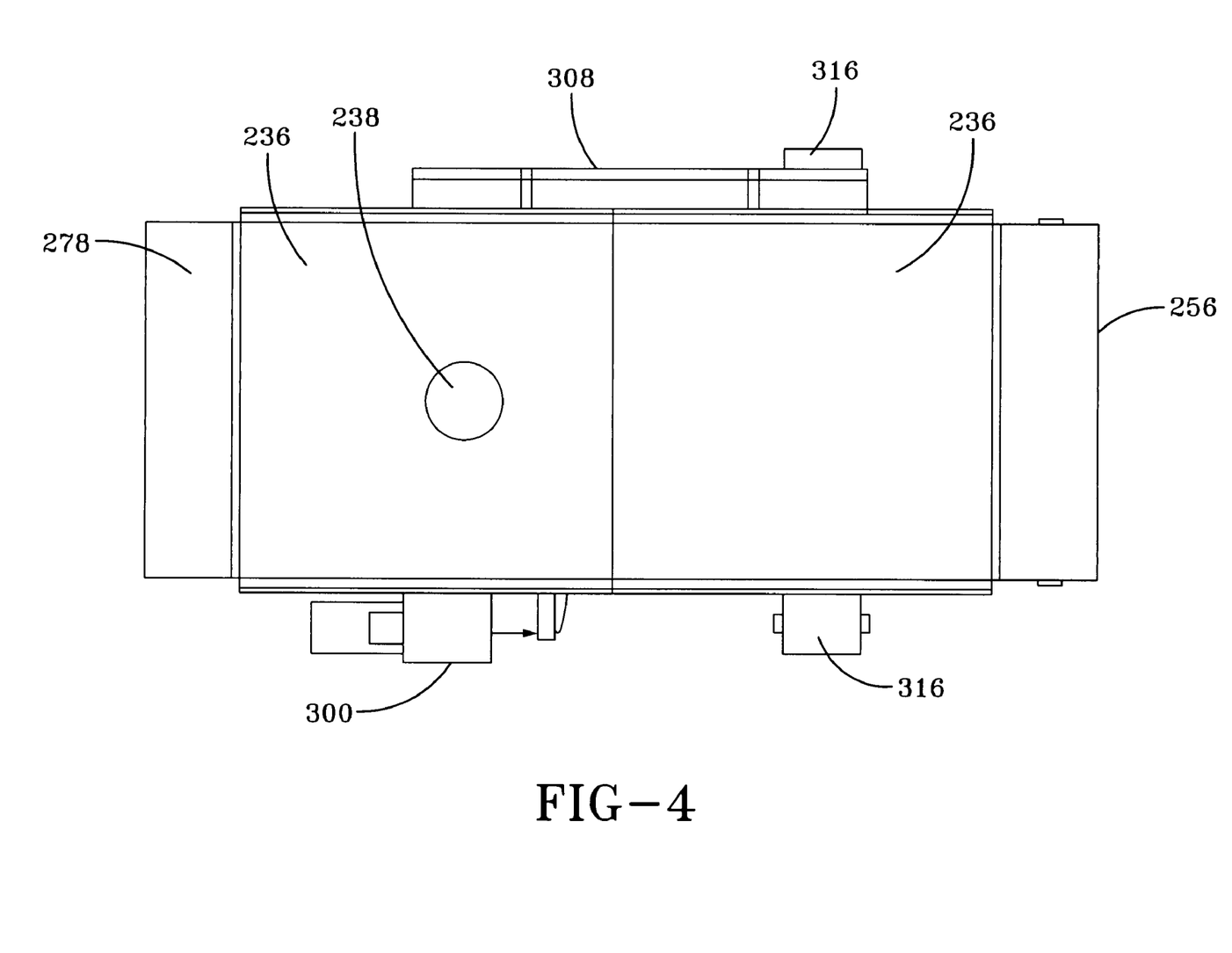
FIG. 4 is a plan view of the separator of the present invention.
Figure 5:
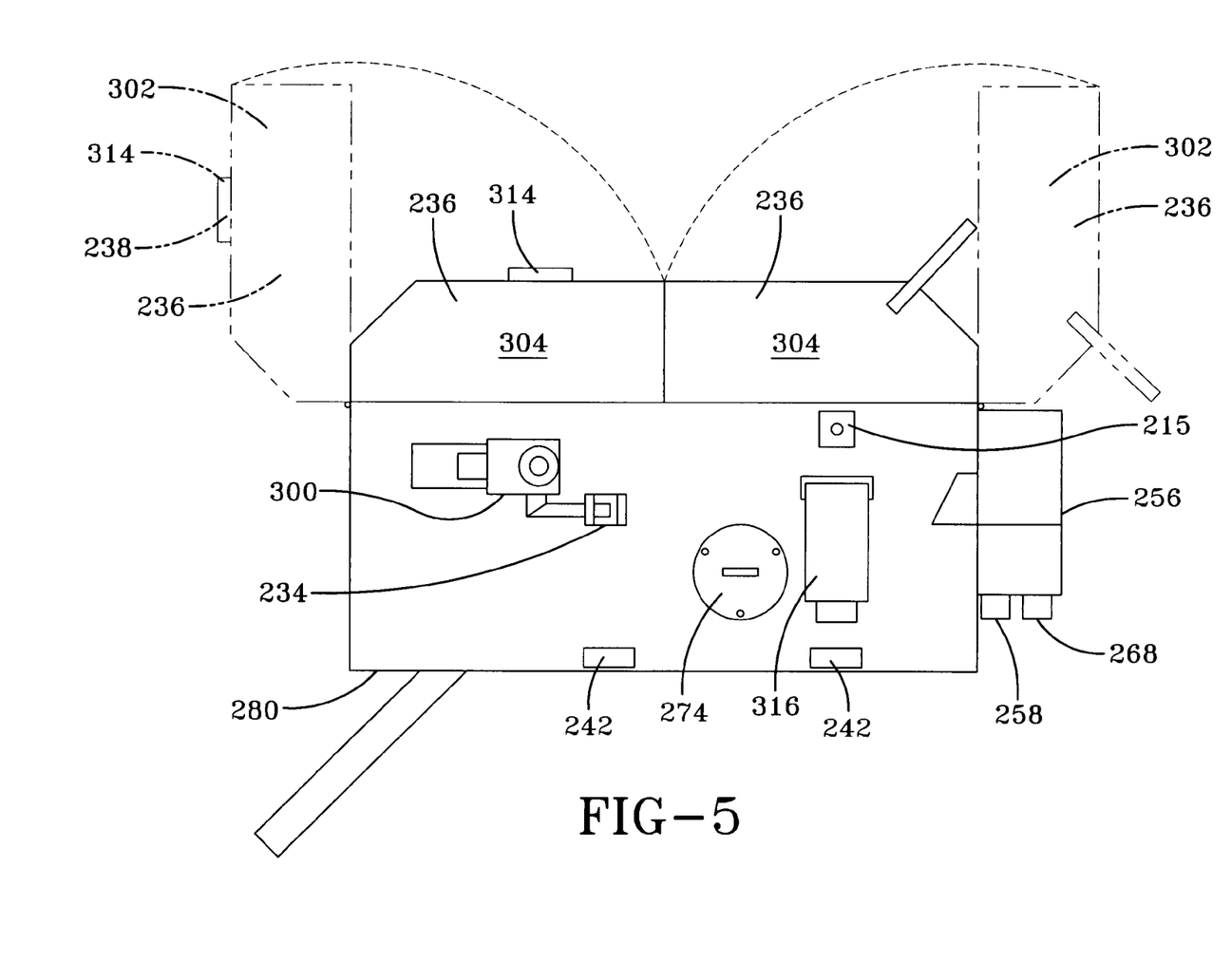
FIG. 5 is an elevation view of the separator of the present invention.

Referring to FIGS. 4 and 5, a motor and gear box 300 are employed to rotatably drive both the first stage brush assembly 204 and the second stage brush assembly 218. In the preferred embodiment, the motor and gear box 300 is configured to urge the second stage brush assembly 218 into rotational movement about the second stage axle 296 by direct drive, meshing gears or by any conventional means known in the art. Simultaneously, the motor and gear box 300 urges the first stage brush assembly 204 into rotational movement about the first stage axle 210. To maintain a predetermined rotational relationship between the first stage brush assembly 204 and the second stage brush assembly 218, a drive chain (not shown) meshes with sprockets (not shown) that are attached to ends of the first stage axle 210 and the second stage axles 296 as is known in the art. To permit ease of access to the drive chain and associated components, a drive chain access cover 308 is provided. Although the preferred embodiment shows a simple electric motor 300, a separator rotating driving means could be provided to rotatably drive the first and the second stage brush assemblies 204, 218, which driving means may employ electrical, pneumatic, or mechanical power to effect the desired rotational movement.

The interior of the separator 200 may be accessed either by opening clamshell lids 236 on the top of the separator 200 or by opening an access panel 274 positioned on both sides of the separator 200. The clamshell lids 236 hinge completely out of the way, and may be completely removed by removing bolts, for unfettered access to the components of the separator. The clamshell lids 236 are an improvement over the prior art semi-permanent superstructure. A duct collar 238 with a cap 314, for heating the separator 200, is mounted on top of at least one of the clamshell lids 236. Optionally, a duct collar 238 may be mounted on both, or either of the clamshell lids 236 mounted on the top of the separator 200. The duct collar 238 allows the attachment of a duct connected to a source of warm air (not shown). While it is still advisable to locate the separator in a building or other protective structure, it is a simple matter to heat the separator by blowing warm air directly into the machine. In this manner, the machine is under a positive pressure thereby preventing cold drafts from entering the machine to freeze influent that is adjacent to or in contact with the functional components. The building or protective structure may also become heated as a result of a warm separator.

The access to and convenience of installing the separator has been improved by fitting the lower chassis 240 with channels 242 sized to accommodate virtually all forklift forks. Preferably, each side or end of the separator 200 has a pair of channels 242, and more preferably, the channels 242 on opposite sides of the separator are aligned, permitting rigging of the separator from any side. Further, the channels 242 may accommodate other lifting means, such as straps, to permit installation of the separator 200 from above.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A rotatable roller press and brush assembly for use within a separator comprising:
   a main arm having opposed ends;
   a main axle configured and disposed to rotatably carry the main arm between the ends;
   at least one brush arm attached to and extending away from the main arm, each of the at least one brush arm being connected to a brush adjacent the end of the brush arm opposite the main arm;
   at least one roller arm having a first end and a second end, the at least one roller arm being rotatably carried between the first end and the second end adjacent at least one of the ends of the main arm;
   a roller being rotatably carried adjacent the first end of the at least one roller arm; and
   a resilient force device connected to at least one roller arm and the main arm for urging the roller away from the main axle, the resilient force being limited for preventing a foreign object entering the separator during operation of the separator from damaging a portion of the separator upon the foreign object being juxtaposed between the roller and the portion of the separator.

2. The rotatable roller press and brush assembly of claim 1 wherein the resilient force device is a spring.

3. The rotatable roller press and brush assembly of claim 2 wherein the spring is a torsion spring.

4. The rotatable roller press and brush assembly of claim 2 wherein the spring is a helical spring.

5. The rotatable roller press and brush assembly of claim 1 wherein the resilient force device is a spring assembly.

6. The rotatable roller press and brush assembly of claim 1, further comprising a plurality of main arms.

7. A manure separator comprising:
a shell;
an inlet comprising a slurry supply section for providing a slurry to the separator;
a first section within the shell comprising a first screen and a rotating brush assembly, the first section being adjacent to and in fluid communication with the inlet, the brush assembly comprising at least one first brush and at least one arm, each of the at least one first brush being attached to at least one arm, and each of the at least one arm being rotatably carried within the shell adjacent the first screen to direct solid slurry components of the slurry from the first section to a second section;
the second section within the shell adjacent to and in fluid communication with the first section, comprising a second screen and a rotating roller press and brush assembly being rotatably carried within the shell adjacent the second screen, the roller press and brush assembly comprising:
a main arm having opposed ends;
a main axle configured and disposed to rotatably carry the main arm between the opposed ends;
at least one brush arm attached to and extending away from the main arm, each of the at least one brush arm being connected to a second brush adjacent the end of the brush arm opposite the main arm;
at least one roller arm having a first end and a second end, the roller arm being rotatably carried between the first end and the second end adjacent at least one of the opposed ends of the main arm;
a roller being rotatably carried adjacent the first end of the at least one roller arm; and
a resilient force device connected to at least one roller arm and the main arm for urging the roller away from the main axle, the resilient force being limited for preventing a foreign object entering the second section during operation of the separator from damaging the second screen upon the foreign object being juxtaposed between the roller and the second screen;
a driving means to urge rotational movement of the brush assembly and the roller press and brush assembly;
a sump in fluid communication with the first section and the second section for draining liquid slurry components of the slurry from the first section and the second section; and
a solids discharge section in communication with the second section for discharging solid slurry components of the slurry from the second section.

8. The separator of claim 7, wherein the shell further comprises a duct collar.

9. The separator of claim 7, wherein the shell further comprises clamshell doors.

10. The separator of claim 7, wherein the shell further comprises a plurality of channels, the channels being configured and disposed to accommodate forklift forks.

11. The separator of claim 7, wherein the rollers comprise ultra high molecular weight plastic.

12. The separator of claim 7, wherein the at least one arm has a central axis and each of the at least one first brush has an angle in the range of about 30 degrees to about 60 degrees between the central axis and the at least one first brush away from a direction of travel of the at least one first brush.

13. The separator of claim 12, wherein each of the at least one first brush is angled at about 45 degrees.

14. The separator of claim 7 wherein the resilient force device is a spring.

15. The separator of claim 14 wherein the spring is a torsion spring.

16. The separator of claim 14 wherein the spring is a helical spring.

17. A manure separator comprising:
a shell;
a weir box in fluid communication with the shell for providing influent to the separator;
a first section within the shell in fluid communication with the weir box comprising a first screen and a rotating brush assembly, the brush assembly comprising a plurality of first brushes and a plurality of arms, each first brush of the plurality of first brushes being attached to an arm of the plurality of arms, and each arm of the plurality of arms being rotatably carried by a first main axle mounted in the shell adjacent the first screen, each arm of the plurality of arms having a first central axis, and each first brush of the plurality of brushes having a first angle in the range of about 30 degrees to about 60 degrees between the first central axis and the plurality of first brushes away from a direction of rotational travel of the plurality of first brushes for directing solid influent from the first section to the second section;
a second section within the shell adjacent to and in fluid communication with the first section, comprising a second screen and a rotating roller press and brush assembly, the roller press and brush assembly comprising:
a main arm having two ends being rotatably carried by a second main axle mounted in the shell adjacent the second screen;
a plurality of brush sub-assemblies attached to and extending away from the main arm, each brush sub-assembly of the plurality of brush sub-assemblies comprising a brush arm having a second central axis and an end opposite the main arm and a second brush attached adjacent the end of the brush arm, each second brush of the plurality of second brushes having a second angle in the range of about 0 degrees to about 45 degrees between the second central axis and the plurality of second brushes in a direction of rotational travel of the plurality of second brushes;
a plurality of roller press sub-assemblies comprising a roller sub-assembly arm having a first end, a second end for rotatably carrying a roller adjacent the first end, each of the plurality of roller press sub-assemblies being rotatably carried between the first end and the second end of the roller sub-assembly arm adjacent one of the two ends of the main arm;
a spring assembly attached to the roller sub-assembly arm for urging the roller in a direction away from the second main axle, the resilient force being limited for preventing a foreign object entering the second section during operation of the separator from damaging the second screen upon the foreign object being juxtaposed between the roller and the second screen; and
a stop screw and a mechanical stop secured to the main arm to adjustably position the roller a predetermined distance from the main axle;

a driving means connected to the brush assembly and the main arm for urging the brush assembly and the main arm into a predetermined rotational movement;

a sump in fluid communication with the first section and the second section for draining liquid influent from the first section and the second section; and a discharge section in communication with the second section for discharging solid influent from the second section.

18. The separator of claim 17, wherein the shell further comprises a duct collar.

19. The separator of claim 17, wherein the shell further comprises clamshell doors.

20. The separator of claim 17, wherein the shell further comprises a plurality of channels, the channels being configured and disposed to accommodate forklift forks.

21. The separator of claim 17, wherein the rollers comprise ultra high molecular weight plastic.

22. A manure separator comprising:

a shell;

a weir box comprising a slurry supply section for providing slurry to the separator;

a first section within the shell comprising a first screen and a rotatable brush assembly, said brush assembly comprising a plurality of brushes and a plurality of arms, each brush being attached to an arm, and each arm being attached to a first axle mounted over the first screen, said arms of the first section being substantially linear, and each brush of the said first section being angled at an angle in the range of about 30 degrees to about 60 degrees away from the arms toward a second section for directing solid influent from the first section to a second section;

the second section within the stainless steel shell comprising a second screen, said second screen comprising stainless steel woven wire mesh, and a rotatable roller press assembly, said roller press assembly being mounted to a second axle mounted over the second screen, said second section being positioned adjacent to said first section, said roller press assembly comprising a plurality of arms, a plurality of brush assemblies attached to said arms, and a plurality of roller sub-assemblies attached to said arms, each of said roller sub-assemblies comprising a center pivot, a first end and a second end, a roller being attached to each first end and a spring assembly attached to each second end, each spring assembly being further attached to one of the brush assemblies;

a plurality of ultra high molecular weight bearings, said bearings being mounted on the shell, the bearings supporting the first main axle and the second main axle;

an electric motor to urge the brush assembly and the roller press assembly into a predetermined rotational movement;

a sump for draining liquid slurry components from the separator; and a solids discharge section for discharging solid slurry components from the second section.

23. The separator of claim 22, wherein each brush of the first section is angled at about 45 degrees.

24. The separator of claim 22, wherein the shell further comprises a duct collar.

25. The separator of claim 22, wherein the shell further comprises clamshell doors.

26. The separator of claim 22, wherein the shell is comprised of stainless steel.

27. A manure separator comprising:

a shell composed of stainless steel;

a weir box comprising a slurry supply section for providing slurry to the separator;

a first section within the shell comprising a first screen comprising stainless steel woven wire mesh and a rotatable brush assembly, said brush assembly comprising a plurality of brushes and a plurality of first arms, each brush being attached to a first arm, and each first arm being attached to a first stainless steel axle mounted over the first screen, said first stainless steel axle being rotatably carried by removable bearings composed of ultra high molecular weight plastic, said first arms of the first section being substantially linear, and each brush of the said first section being angled at an angle in the range of about 30 degrees to about 60 degrees away from the first arms toward a second section for directing solid influent from the first section to a second section;

the second section within the stainless steel shell comprising a second screen and a rotatable roller press assembly, said roller press assembly being mounted to a second stainless steel axle mounted over the second screen, said second stainless steel axle being rotatably carried by removable bearings composed of ultra high molecular weight plastic, said second section being positioned adjacent to said first section, said roller press assembly comprising a plurality of second arms, a plurality of brush assemblies attached to said second arms, and a plurality of roller sub-assemblies attached to said second arms, each of said roller sub-assemblies comprising a center pivot, a first end and a second end, a roller composed of ultra high molecular weight plastic being attached to each first end and a spring assembly attached to each second end, each spring assembly being further attached to one of the brush assemblies;

an electric motor to urge the brush assembly and the roller press assembly into a predetermined rotational movement;

at least one clamshell lid pivotably mounted to the shell, said at least one clamshell lid being in fluid communication with a source of warm air for heating the separator;

a sump for draining liquid slurry components from the separator; and a solids discharge section for discharging solid slurry components from the second section.

* * * * *